United States Patent Office 3,448,194
Patented June 3, 1969

3,448,194
COMBATTING GRAM-POSITIVE BACTERIA WITH DODECACHLOROOCTAHYDRO-1,3,4-METHENO-2H-CYCLOBUTA (cd) PENTALENE; DECACHLOROOCTAHYDRO - 1,3,4 - METHENO - 2H-CYCLOBUTA (cd) PENTALEN-2-ONE, AND CERTAIN OF THEIR DERIVATIVES
Seymour S. Block, Gainesville, Fla., and Merrill M. Darley, Basking Ridge, N.J., assignors to Allied Chemical Corporation, New York, N.Y., a corporation of New York
No Drawing. Filed May 4, 1966, Ser. No. 547,426
Int. Cl. A61k 27/00
U.S. Cl. 424—313                    13 Claims This invention relates to antimicrobial compositions, and more particularly to antimicrobial compositions containing as active ingredient dodecachlorooctahydro-1,3,4-metheno-2H-cyclobuta (cd) pentalene, decachlorooctahydro-1,3,4-metheno-2H-cyclobuta (cd) pentalen-2-one and certain derivatives prepared therefrom, and to their use in combating microorganisms.

Dodecachlorooctahydro-1,3,4-metheno-2H - cyclobuta (cd) pentalene and decachlorooctahydro-1,3,4-metheno-2H-cyclobuta (cd) pentalen-2-one have been previously known to be effective toxicants to certain insects and fungi. It has now been unexpectedly found that dodecachlorooctahydro-1,3,4-metheno - 2H - cyclobuta (cd) pentalene and decachlorooctahydro-1,3,4-metheno-2H-cyclobuta (cd) pentalen-2-one, as well as certain derivatives thereof herein below described, exhibit effective antimicrobial activity, particularly against grampositive bacteria and dermatophytic fungi. The compounds which serve as active ingredients of the present compositions have additionally been found to be outstandingly effective against staphylococci which have become resistant to conventional antibiotics and some of the established bactericides.

The antimicrobial compositions of the present invention comprise, as active ingredient, an effective amount of a compound selected from the group consisting of: dodecachlorooctahydro-1,3,4-metheno-2H-cyclobuta (cd) pentalene; decachlorooctahydro-1,3,4-metheno-2H-cyclobuta (cd) pentalen-2-one; the alcohol obtained by reduction of decachlorooctahydro-1,3,4-metheno-2H-cyclobuta (cd) pentalen-2-one; and an adduct of decachlorooctahydro-1,3,4-metheno-2H-cyclobuta (cd) pentalen-2-one and a member of the group consisting of an amine, alcohol, ketone and malonic acid derivative.

Dodecachlorooctahydro-1,3,4-metheno - 2H - cyclobuta (cd) pentalene is a white, crystalline-free flowing solid having the empirical formula $C_{10}Cl_{12}$, a molecular weight of 546 and a melting point of 485° C. It may be conveniently prepared by heating the reaction product of hexachlorocyclopentadiene and sulfur trioxide with phosphorus pentachloride as is described and claimed in U.S. Patent 2,702,305.

Decachlorooctahydro-1,3,4-metheno-2H-cyclobuta (cd) pentalen-2-one, hereafter referred to as "DMCP," is a complex chlorinated polycyclic ketone having the molecular formula $C_{10}Cl_{10}O$ and a molecular weight of 490.68. This compound, a white crystalline solid subliming with some decomposition when heated in the open atmosphere to 300° C., may be conveniently prepared by mixing hexachlorocyclopentadiene with sulfur trioxide to form a hexachlorocyclopentadiene reaction product and hydrolyzing the reaction product as is described and claimed in U.S. Patent Re. 24,435.

The alcohol obtained by reduction of DMCP is a complex chlorinated polycyclic alcohol having the molecular formula $C_{10}Cl_{10}HOH$. This alcohol is prepared by refluxing DMCP with a metallic hydride under substantially anhydrous conditions at elevated temperatures as is described and claimed in co-pending U.S. application Ser. No. 255,065, filed Jan. 30, 1963, of Everett E. Gilbert and Pasquale Lombardo now U.S. Patent 3,361,623.

The DMCP-amine adducts contemplated herein comprise those obtained by reactiong DMCP with a primary of secondary monoamine as is described and claimed in co-pending application Ser. No. 444,371 of Everett E. Gilbert and Pasquale Lombardo, filed Mar. 31, 1965 now U.S. Patent 3,259,543. These amines may be aliphatic, cycloaliphatic or aromatic and may contain other substituents such as alkyl or aryl groups, ether and thioether linkages and halogens. Furthermore, it is intended that the term "monoamine" include ammonia, furfurylamine, piperidine and piperazine. The monoamines include (1) alkyl, cycloalkyl, cycloalkyl-substituted alkyl and aryl-substituted alkyl primary and secondary monoamines containing from 1 to 22 carbon atoms and (2) aryl and alkyl-substituted aryl primary monoamines containing from 1 to 22 carbon atoms. Adducting compounds of this class may be represented by dimethylamine, n-propylamine, isopropylamine, t-butylamine, n-amylamine, furfurylamine, piperidine, aniline, n-hexylamine, di-n-propylamine, cyclohexylamine, n-heptylamine, benzylamine, o-toluidine, n-octaylamine, 2-ethylhexylamine, n-methylbenzylamine, α-phenylethylamine, di-sec-butylamine, dodecylamine, tetra-decylamine, hexadecylamine and dihydroabietylamine.

The DMCP-alcohol adducts contemplated herein comprise those obtained by reacting DMCP with a primary or secondary monohydric alcohol as is described and claimed in the above mentioned U.S. application Ser. No. 444,371, now U.S. Patent 3,259,543. These alcohols may be alphatic, cycloaliphatic of aromatic and may contain other substituents such as alkyl or aryl groups, ether and thioether linkages and halogens. The monohydric alcohols employed in producing the DMCP-alcohol adducts include (1) alkyl, cycloalkyl-substituted alkyl and aryl-substituted alkyl primary and secondary monohydric alcohols containing from 1 to 18 carbon atoms and (2) cycloalkyl and alkyl-substituted cycloalkyl secondary monohydric alcohols containing from 1 to 18 carbon atoms. Illustrative monohydric adducting alcohols employable herein include methanol, 1-propanol, isopropanol, 1-butanol, 1-pentanol, primary amyl alcohol, isoamyl alcohol, 3-pentanol, 2-methyl-1-butanol, cyclopentanol, 2-hexanol, 2-ethyl-1-butanol, cyclohexanol, 1-heptanol, 3-methylcyclohexanol, methyl cyclopentyl carbinol, cyclohexyl methanol, benzyl alcohol, 1-octanol, 2-ethyl-4-methyl-1-pentanol, phenethyl alcohol, methyl benzyl alcohol, 1-decanol, 2-sec-butylcyclohexanol, 2,6,8-trimethyl-4-nonanol, 2-cyclohexylcyclohexanol and 1-octadecanol.

Other monohydric alcohols include oxirane condensates obtained by reaction of a compound having an active hydrogen atom such as an alcohol, amine and a phenol with a lower alkylene oride such as ethylene oxide of propylene oxide. The alcohols and amines may be those defined above. The phenols are typified by alkyl phenols in which the alkyl group contains 5 to 15 carbon atoms. The oxirane condensates, which are primary alcohols, are generally produced using 1 to 4 mols of the alkylene oxide per mol of the alcohol, amine or phenol. Adducting compounds illustrative of this type of monohydric alcohol include condensates of methanol and ethylene oxide, ethanol and ethylene oxide, nonyl phenol and ethylene oxide, n-ethyl aniline and ethylene oxide, di-(n-butyl) amine and ethylene oxide, diethylamine and ethylene oxide, n-butylamine and ethylene oxide, di-(n-butyl) amine and propylene oxide, and ammonia and propylene oxide.

The ketone adducts contemplated herein comprise those obtained by reacting DMCP with a ketone having a general formula selected from the group consisting of:

(1) $RCH_2COR^1$ in which R is a member of the group consisting of hydrogen and methyl and $R^1$ is a member of the group consisting of alkyl, aryl and acyl radicals;

(2)

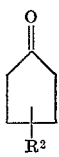

in which $R^2$ is a member of the group consisting of hydrogen and alkyl radicals; and (3)

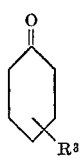

in which $R^3$ is a member of the group consisting of hydrogen and alkyl radicals, as is described and claimed in co-pending application Ser. No. 266,215 of Pasquale Lombardo, filed Mar. 19, 1963 presently abandoned, in favor of continuation-in-part application Ser. No. 606,505, filed Dec. 23, 1966, now U.S. Patent 3,393,223.

In the compounds having the general formula $RCH_2COR^1$, the alkyl and aryl radicals represented by $R^1$ may be substituted or unsubstituted. The substituted alkyl radicals include, but are not limited to, arylalkyl, haloalkyl and carboalkoxyalkyl. The unsubstituted alkyl radicals preferably contain 1 to 9 carbon atoms, while the alkyl portion of the substituted alkyl radicals preferably contains 1 to 4 carbon atoms. The alkoxy portion of the carboalkoxyalkyl radicals also preferably contains 1 to 4 carbon atoms. Among the compounds in this category are 2-octanone, 2-nonanone, 2-heptanone, 2-undecanone, acetone, 4-methyl-2-pentanone, 3-pentanone, 2-butanone, 2-pentanone, diacetyl, chloroacetone, phenylacetone, acetophenone, 3-methyl-2-butanone, ethyl levulinate, ethyl pyruvate, butyl levulinate and methyl pyruvate.

In the compounds represented by the general formula

the alkyl radical preferably contains 1 to 3 carbon atoms. Compounds in this category include cyclopentanone, 2-methylcyclopentanone, 3-methylcyclopentanone and 4-methylcyclopentanone.

In the group of compounds represented by the general formula

the alkyl radical preferably contains 1 to 3 carbon atoms. Compounds in this category include cyclohexanone, 2-methylcyclohexanone and 3-methylcyclohexanone.

The DMCP-malonic acid derivative adducts contemplated by the present invention comprise those obtained by reacting DCMP with a malonic acid derivative selected from the group consisting of dialkyl malonates, diaryl malonates and malonanilide as is described and claimed in co-pending application Ser. No. 255,097 of Everett E. Gilbert and Pasquale Lombardo, filed Jan. 30, 1963 now U.S. Patent 3,278,579. Any dialkyl or diaryl malonate may be used as a reactant with DMCP. Typical malonates include dimethyl, diethyl, dipropyl, di(n-butyl), di(n-hexyl), di(n-dodecyl), diphenyl and dinaphthyl malonates.

The compounds described above are uesful in combatting a broad spectrum of species of the more commonly encountered microorganisms and exhibit particularly effective antimocrobial activity against gram-positive bacteria including antibiotic-resistant Staphylococci and dermatophytic fungi.

Although the above-described compounds are useful per se in combatting a wide variety of microorganisms, it is preferred that the compounds be supplied to the microorganisms or to the environment of the microorganisms in conjunction with a major proportion of an antimicrobial adjuvant therefor which may be a liquid, solid or gaseous material, the above compounds constituting the active ingredient of such compositions. The antimicrobic compounds may be employed in solutions, either in water or an organic solvent in both aqueous and non-aqueous suspensions such as lotions, pastes and creams or in suspensions or solutions in a detergent, paint or varnish. The compounds can also be used in dry form as in a dusting powder, or in any other way that antiseptics and preservatives are conventionally employed, as for example, an aerosol type formulation. It is not intended that this inveitnon be limited to any specific proportions of active ingredient and antimicrobial adjuvant and the amount of active ingredient used in combatting the microorganisms may vary considerably provided a sufficient quantity is used to provide the desired toxicity. Generally, formulations containing at least about 0.5% and as high as 50.0% of active ingredient based on the total weight of the formulation, may be used in treating animals and man.

Liquid compositions containing the antimicrobic agents of this invention may be prepared by first forming a solution of the compound in a suitable solvent, e.g. acetone, methylethyl ketone, xylene, dioxane, methylated naphthalene, solvent naphtha, dimethyl formamide and cyclohexanone. These liquid compositions, either solutions or dispersions, generally also contain a surface active dispersing agent in amount sufficient to render the composition readily useful in aqueous spray applications. These surface active agents, normally referred to as wetting, penetrating, emulsifying or dispersing agents, can be either anionic, cationic or nonionic. Illustrative surface active agents include salts of long chain fatty acids, petroleum oils, sulfates and phosphates of long chain alcohols and various polyethylene oxides, etc. The surface active agent would usually be present in an amount of 1 to 10% of the formulation. The resulting concentrate solution, usually containing about 2 to 4 pounds of the antimicrobic agent per gallon of solvent, may be incorporated with water in quantity sufficient to form an aqueous dispersion or emulsion having the desired active ingredient concentration.

When employed in the form of a powder or dust for controlling microorganisms, the antimicrobic compounds may be mixed with a substantial portion of any suitable inert material or diluent, preferably in finely divided form, such as fuller's earth, bentonite, sulfur, lime, talc, whiting, diatomaceous earth, etc. A preferred formulation of the compound comprises employment of an aqueous spray dispersion formed by incorporating in water dry mixtures or so-called wettable powders containing the antimicrobic agents of the invention. Normally, these compositions comprise the active ingredient defined hereinabove in combination with a minor amount of a surface active agent, for example, of the type described above. In preparing these concentrated wettable powders, it is preferred to employ between about 1 and 5% of the surface active agent, based upon the amount of active ingredient, and up to 45% of the inert carrier based upon the total amount of the formulation. Such concentrated formulations are particularly advantageous since they permit economical storage and transportation of the compositions of the present invention.

The compounds described above also find effective use when formulated in aerosol formulations, i.e. when mixed with a liquid having a sufficiently low boiling point that it becomes a gas when released from a confined space. Suitable diluents used in these formulations are halogenated hydrocarbons such as hexafluoroethane, tetrafluoromethane, dichlorodifluoromethane, trifluoromethane and pentafluorochloroethane; carbon dioxide; hydrogen sulfide; ammonia and sulfur dioxide.

The above compounds are also effective when formulated in an ointment, lotion, cream or paste for topical application to the epidermis of animals and man. These formulations, as well as solutions containing the active ingredient of the invention, may be employed in treating minor cuts and abrasions to prevent infection.

The effectiveness of typical compounds of the invention as antimicrobic agents is illustrated by the following tests.

*Bacteristatic screening test*

Eighteen-hour broth cultures (trypticase soy broth) of bacteria from agar slants were employed. Agar "pour plates" (trypticase soy agar) were made utilizing 0.5 ml. of the bacterial culture in broth per 100 ml. of agar. Absorbant paper squares (15 x 15 mm.) were impregnated with 1 mg. of the test compound dissolved in acetone. The acetone was permitted to evaporate and the paper squares placed upon hardened agar, each in the center of each plate. The plates were incubated for 24 hours at 37° C. and subsequently examined for zones of inhibition around the treated papers. After the zones were measured (in millimeters), the papers were removed and the agar beneath them and also the inhibited zones sampled for bacteria with a sterile needle. The needle was dipped into a sterile broth culture and incubated for 24 hours to determine whether the bacteria from the agar survived after prolonged contact with the chemicals on the treated paper. Minimum inhibiting concentrations, in parts per million (based on the weight of the agar medium), of the compounds tested against the particular microorganisms were also determined after allowing the microorganisms to be in contact with the chemical for a period of 18 hours.

*Bactericidal screening test*

Dilutions of the test compounds were made in broth (trypticase soy) in tubes. To each of the tubes there was added an equal volume of an 18 hour culture of the test organism. The tubes and controls, with the solvent (acetone) in the same concentrations as in the samples, were incubated at 37° C. for 18 hours. After this period, each tube was subsequently subcultured into trypticase soy agar and incubated at 37° C. to confirm the presence of live organisms. The concentration, reported in parts per million (based on the weight of the agar medium), at which there were no surviving organisms was designated as the minimum lethal concentration.

*Fungistatic agar plate screening test*

This test was run in a manner similar to the bacteristatic test with a few exceptions. The plates employed potato dextrose agar containing 6 percent agar in place of trypticase soy agar. The plates were flooded with a suspension of the spores of the fungus obtained from an agar slant. After the excess water of the spore suspension was absorbed by the agar (2 to 3 hours), the treated paper squares were placed on the agar plates and the seeded plates were incubated at 30° C. The inhibition of growth of the fungi, determined by measuring the comparative zones of growth (in millimeters) of the treated and untreated agar mediums, was noted after 21 days.

The high degree of activity of these compounds against a broad spectrum of species of the more commonly encountered microorganisms, particularly against gram-positive bacteria and dermatophytic fungi, is illustrated by the data, obtained from the above tests, set forth in Tables Ia, Ib, II and III which follow.

Tables Ia and Ib provide results of bacteristatic tests showing specific inhibitory values of representative compounds encompassed by the present invention. In Table Ia, column 1 gives the name of the compound tested and column 2 records the area of inhibition in millimeters realized against the particular microorganisms listed at the head of the table. In Table Ib, column 1 gives the name of the compound tested and column 2 records the minimum concentrations in parts per million (based on the weight of the agar medium), required to inhibit growth of the particular microorganisms listed at the head of the table.

Table II sets forth the results of bactericidal tests reflecting the lethal effectiveness of typical compounds of the invention. In this table, column 1 gives the name of the compound tested and column 2 records the minimum lethal concentration, in parts per million (based on the weight of the agar medium), required against the particular microorganisms listed at the head of the table.

Table III provides results of fungistatic tests of several typical compounds of the invention as well as of a commercially available antiseptic. In Table II, column 1 gives the name of the compound tested, column 2 gives the dosage at which the compound was tested and the remaining columns reflect the degree of inhibition, determined by measuring the comparative zones of growth (in millimeters) of the treated and untreated agar medium, achieved in a period of 21 days against the dermatophytic fungi listed at the head of the table.

TABLE Ia

| Compound | Zone of Inhibition [1] (mm.) | | | | | | |
|---|---|---|---|---|---|---|---|
| | A[2] | B[2] | C[2,3] | D[2,3] | E[2,4] | E[2,3] | F[2,3] |
| DMCP-condensate of nonyl phenol and ethylene oxide adduct | 4 | 3 | | | | | |
| DMCP-n-tetradecylamine adduct | 2 | 2 | 1 | 1 | <1 | 1 | 1 |
| DMCP-"Pentasol #27" [a] | 5 | 5 | 6 | 6 | 1 | 3 | 6 |
| DMCP-"Duomeen C" [b] | 2 | 3 | | | 2.5 | | |
| DMCP-n-dodecylamine adduct | 4 | 4 | | | | | |
| DMCP-"Branched Chain Primary Alcohols #52" adduct [c] | 5 | 3 | 5 | 6 | 1 | 3 | 5 |
| DMCP-1-butanol adduct | 5 | 5 | 5 | 4 | | 2 | 5 |
| DMCP-"Primene JMT" adduct [d] | 4 | 4 | | | 8 | | |
| DMCP-n-hexylamine adduct | 5 | 4 | | | 3 | | |
| DMCP-cyclohexanone adduct | 4 | 3 | | | <1 | | |
| DMCP-2-nonanone adduct | 2 | <1 | | | | | |
| DMCP-3-pentanone adduct | 2 | 4 | | | 1 | | |
| DMCP-4-methyl-2-pentanone adduct | 4 | 4 | | | 1 | | |
| DMCP-2-heptanone adduct | 1 | 4 | | | 1.5 | | |
| DMCP-2-pentanone adduct | 7 | 4 | 5 | 6 | <1 | 3 | 5 |
| DMCP-methylethyl ketone adduct | 7 | 4 | | | <1 | | |
| DMCP-diethylmalonate adduct | 3 | 4 | | | <1 | | |
| DMCP-monochloroacetone adduct | 1 | 2 | | | | | |
| DMCP-di(n-hexyl) malonate adduct | 1 | 1 | | | 1 | | |
| DMCP-phenylacetone adduct | <1 | | | | | | |
| Alcohol obtained by reduction of DMCP | 1 | 2 | | | 2 | | |
| DMCP-3-methyl-2-butanone adduct | 1 | <1 | | | <1 | | |
| DMCP-diphenylmalonate adduct | 1 | 1 | | | | | |
| DMCP-diacetyl adduct | 4 | 4 | | | | | |
| DMCP | 3 | 3 | 4 | | <1 | | 4 |
| Control | 0 | 0 | 0 | 0 | 0 | 0 | 0 |

[1] Determined by the bacteristatic agar plate screening test described above.
[2] A=*Bacillus cereus*; B=*Staphylococcus aureus*; C=*Streptococcus agalactaciae*; D=*Bacillus subtilis*; E=*Saccharomyces cerevisiae*; F=*Corynebacterium diphtheriaemitis*.
[3] Results recorded after 3 days' incubation.
[4] Results recorded after 3 days' incubation.
[a] Derived from a commercial alcohol mixture containing mixed synthetic primary and secondary amyl alcohols and having a boiling range of 118–140° C.
[b] Derived from a commercial amine mixture having a melting range of 18–26° C. and having the general formula RNH(CH²)³NH²R wherein R is obtained from a cocunut fatty acid of above about 90% saturation.
[c] Derived from a commercial alcohol mixture principally containing branched chain primary amyl alcohols and having a boiling range of 128–133° C.
[d] Derived from a commercial amine mixture principally containing tertiary alkyl primary monoamines containing 18 to 22 carbon atoms.

TABLE Ib

| Compound | Minimum Inhibitory Concentration [1] (p.p.m.) | | | | | | |
|---|---|---|---|---|---|---|---|
| | B [2] | G [2] | H [2] | I [2] | A [2] | F [2] | E [2] |
| DMCP-condensate of nonyl phenol and ethylene oxide adduct | 0.32 | 200–1,000 | | | | | |
| DMCP-n-tetradecylamine adduct | 0.32–1.6 | 200–1,000 | | | | | |
| DMCP-"Pentasol #27" [a] | 0.32–1.6 | >1,000 | | | | | |
| DMCP-"Duomene C" [b] adduct | 0.32–1.6 | 40–200 | | | | | |
| Dodecachlorooctahydro-1,3,4-metheno-2H-cyclobuta [c] [d] pentalene | 8–40 | >1,000 | | | | | |
| DMCP-n-dodecylamine adduct | 1.6–8 | 200–1,000 | | | | | |
| DMCP-"Branched Chain Primary Alcohols #52" [c] adduct | 0.32 | >1,000 | | | | | |
| DMCP-1-butanol adduct | 0.32 | 200–1,000 | | | | | |
| DMCP-"Primene JMT" [d] adduct | 0.01–0.06 | 200–1,000 | 8–40 | 200–1,000 | 8–40 | 40–200 | 8 |
| DMCP-n-hexylamine adduct | 1.6–8 | 200–1,000 | | | | | |
| DMCP-cyclohexanone adduct | 0.32–1.6 | 1,000 | | | | | |
| DMCP-2-nonanone adduct | 8–40 | 200–1,000 | | | | | |
| DMCP-3-pentanone adduct | 0.32 | 200–1,000 | | | | | |
| DMCP-4-methyl-2-pentanone adduct | 0.32–1.6 | 200–1,000 | | | | | |
| DMCP-2-undecanone adduct | 40–200 | 200–1,000 | | | | | |
| DMCP-2-octanone adduct | 8–40 | 200–1,000 | | | | | |
| DMCP-2-heptanone adduct | 8–40 | 200–1,000 | | | | | |
| DMCP-2-pentanone adduct | 0.32 | 200–1,000 | | | | | |
| DMCP-methly ethyl ketone adduct | 0.06–0.32 | 200–1,000 | | | | | |
| DMCP-diethylmalonate adduct | 0.32–1.6 | 200–1,000 | | | | | |
| DMCP-monochloroacetone adduct | 0.32 | 200–1,000 | 40–200 | 200–1,000 | 40–200 | 40–200 | 40–200 |
| DMCP-di(n-hexyl) malonate adduct | 1.6–8 | 200–1,000 | | | | | |
| DMCP-phenylacetone adduct | 8–40 | 200–1,000 | | | | | |
| Alcohol obtained by reduction of DMCP | 0.06–0.32 | 200–1,000 | 40–200 | >1,000 | 40–200 | 40–200 | 40–200 |
| DMCP-malonanilide adduct | 40–200 | 200–1,000 | | | | | |
| DMCP-3-methyl-2-butanone adduct | 1.6–8 | 200–1,000 | | | | | |
| DMCP-diphenyl malonate adduct | 1.6–8 | 200–1,000 | | | | | |
| DMCP-diacetyl adduct | 1.6–8 | 200–1,000 | | | | | |
| DMCP-acetophenone adduct | 200–1,000 | 200–1,000 | | | | | |
| DMCP | 0.32 | 200–1,000 | | | | | |
| Control | 0 | 0 | 0 | 0 | 0 | 0 | 0 |

[1] Determined by the bacteristatic agar plate screening test described above; where a range is given, there was no growth at the higher concentration, but growth at the lower concentration shown.
[2] B=*Staphylococcus aureus*; G=*Pseudomonas aeruginosa*; H=*Salmonella typhosa*; I=*Aerobacter aerogenes*; A=*Bacillus cereus*; F=*Corynebacterium diphtheriaemitis*; E=*Saccharomyces cerevisiae*.
[a] Derived from a commercial alcohol mixture containing mixed synthetic primary and secondary amyl alcohols and having a boiling range of 118–140° C.
[b] Derived from a commercial amine mixture having a melting range of 18–26° C. and having the general formula RNH(CH$_2$)$_3$—NH$_2$R wherein R is obtained from a coconut fatty acid of above about 90% saturation.
[c] Derived from a commercial alcohol mixture principally containing branched chain primary amyl alcohols and having a boiling range of 128–133° C.
[d] Derived from a commercial amine mixture principally containing tertiary alkyl primary monoamines containing 18 to 22 carbon atoms.

TABLE II

| Compound | Minimum Lethal Concentration [1] (p.p.m.) | | | | | | |
|---|---|---|---|---|---|---|---|
| | B [2] | G [2] | H [2] | I [2] | A [2] | F [2] | E [2] |
| DMCP-condensate of nonyl phenol and ethylene oxide adduct | 1.6–8 | >1,000 | | | | | |
| DMCP-n-tetradecylamine adduct | 1.6–8 | 200–1,000 | | | | | |
| DMCP-"Pentasol #27" [a] adduct | 0.32–1.6 | >1,000 | | | | | |
| DMCP-"Duomeen C" [b] adduct | 1.6–8 | 200–1,000 | | | | | |
| Dodecachlorooctahydro-1,3,4-metheno-2H-cyclobuta [c] [d] pentalene | 40–200 | >1,000 | | | | | |
| DMCP-n-dodecylamine adduct | 40–200 | 200–1,000 | | | | | |
| DMCP-"Branched Chain Primary Alcohols #52" [c] adduct | 0.32–1.6 | >1,000 | | | | | |
| DMCP-1-butanol adduct | 0.32–1.6 | >1,000 | | | | | |
| DMCP-"Primene JMT" [d] adduct | 0.01–0.06 | 200–1,000 | 8–40 | >1,000 | 8–40 | 40–200 | 8–40 |
| DMCP-n-hexylamine adduct | 200–1,000 | 200–1,000 | | | | | |
| DMCP-cyclohexanone adduct | 1.6–8 | >1,000 | | | | | |
| DMCP-2-nonanone adduct | 40–200 | >1,000 | | | | | |
| DMCP-3-pentanone adduct | 1.6–8 | >1,000 | | | | | |
| DMCP-4-methyl-2-pentanone adduct | 1.6–8 | >1,000 | | | | | |
| DMCP-2-undecanone adduct | >1,000 | >1,000 | | | | | |
| DMCP-2-octanone adduct | 200–1,000 | >1,000 | | | | | |
| DMCP-2-heptanone adduct | 40–200 | >1,000 | | | | | |
| DMCP-2-pentanone adduct | 0.32–1.6 | >1,000 | | | | | |
| DMCP-methyl ethyl ketone adduct | 0.32–1.6 | >1,000 | | | | | |
| DMCP-diethylmalonate adduct | 8–40 | >1,000 | | | | | |
| DMCP-monochloroacetone adduct | 0.32–1.6 | >1,000 | 40–200 | >1,000 | 40–200 | 200–1,000 | 200–1,000 |
| DMCP-di(n-hexyl) malonate adduct | 8–40 | 200–1,000 | | | | | |
| DMCP-phenylacetone adduct | 200–1,000 | 200–1,000 | | | | | |
| Alcohol obtained by reduction of DMCP | 0.06–0.32 | 200–1,000 | 200–1,000 | >1,000 | 40–200 | 40–200 | 40–200 |
| DMCP-malonanilide adduct | >1,000 | 200–1,000 | | | | | |
| DMCP-3-methyl-2-butanone adduct | 1.6–8 | 200–1,000 | | | | | |
| DMCP-diphenyl malonate adduct | 40–200 | 200–1,000 | | | | | |
| DMCP-diacetyl adduct | 8–40 | 200–1,000 | | | | | |
| DMCP-acetophenone adduct | 200–1,000 | 200–1,000 | | | | | |
| DMCP | 1.6–8 | >1,000 | | | | | |
| Control | 0 | 0 | 0 | 0 | 0 | 0 | 0 |

[1] Determined by bactericidal screening test described above; where a range is given, there was no growth at the higher concentration but growth at the lower concentration shown.
[2] B=*Staphylococcus aureus*; G=*Pseudomonas aeruginosa*; H=*Salmonella typhosa*; I=*Aerobacter aerogenes*; A=*Bacillus cereus*; F=*Corynebacterium diphtheriaemitis*; E=*Saccharomyces cerevisiae*.
[a] Derived from a commercial alcohol mixture containing mixed synthetic primary and secondary amyl alcohols and having a boiling range of 118–140° C.
[b] Derived from a commercial amine mixture having a melting range of 18–26° C. and having the general formula RNH(CH$_2$)$_3$—NH$_2$R wherein R is obtained from a coconut fatty acid of above about 90% saturation.
[c] Derived from a commercial alcohol mixture principally containing branched chain primary amyl alcohols and having a boiling range of 128–133° C.
[d] Derived from a commercial amine mixture principally containing tertiary alkyl primary monoamines containing 18 to 22 carbon atoms.

TABLE III.—AGAR INCORPORATION FUNGISTATIC TESTS [1]

| Compound | Dosage (ppm) | Percent inhibition of growth in 3 weeks | | | | | |
|---|---|---|---|---|---|---|---|
| | | Trichophyton rubrum | Microsporium canis | Trichophyton mentagrophytes | Microsporium audouini | Microsporium gypseum | Tinea tonsurans |
| Hexachlor [a] | 400 | 85 | 77 | 83 | 94 | 94 | 84 |
| DMCP-n-dodecylamine adduct | 400 | 90 | 68 | 73 | | | |
| DMCP-n-tetradecylamine adduct | 400 | | | 64 | | | |
| DMCP-"Pentasol #27" [b] adduct | 400 | 85 | 73 | 75 | | | |
| DMCP-"Branched Chain Primary Alcohols #52" [c] adduct | 400 | 83 | 71 | 77 | | | |
| DMCP-1-butanol adduct | 400 | 83 | 52 | 75 | | | |
| DMCP-"Primene JMT" [d] adduct | 400 | 98 | 98 | 81 | 100 | 96 | 97 |
| DMCP-2-pentanone adduct | 400 | 88 | 73 | 79 | | | |
| DMCP-monochloroacetone adduct | 400 | 73 | 56 | | | | |
| Alcohol obtained by reduction of DMCP | 400 | 83 | 71 | | | | |
| DMCP | 400 | 83 | 56 | | | | |

[1] Determined by the fungistatic screening test described above.
[a] A commercially available antiseptic containing hexachlorophene, 2,2'-methylene bis-(3,4,6-trichlorophenol).
[b] Derived from a commercial alcohol mixture principally containing n-amyl alcohol.
[c] Derived from a commercial alcohol mixture principally containing branched chain primary amyl alcohols.
[d] Derived from a commercial amine mixture principally containing tertiary alkyl primary monoamines, containing 18 to 22 carbon atoms.

Since various changes and modifications may be made in the invention without departing form the spirit thereof, it is intended that all matter contained in the above description be interpreted as illustrative and not in a limiting sense.

We claim:

1. The process of combatting gram-positive bacteria microorganisms which comprises treating the microorganisms with an effective amount of a compound selected from the group consisting of: dodecachlorooctahydro-1,3,4-metheno-2H-cyclobuta (cd) pentalene; decachlorooctahydro - 1,3,4 - metheno-2H-cyclobuta (cd) pentalen-2-one; the alcohol obtained by reduction of decachlorooctahydro - 1,3,4-metheno-2H-cyclobuta (cd) pentalen-2-one; and an adduct of decachlorooctahydro-1,3,4-metheno-2H-cylobuta (cd) pentalen-2-one and a member of the group consisting of (I) aliphatic, cycloaliphatic and aromatic primary and secondary monoamines; (II) aliphatic, cycloaliphatic and aromatic primary and secondary monohydric alcohols; (III) a ketone having a formula selected from the group consisting of
 (1) $RCH_2COR^1$ in which R is a member of the group consisting of hydrogen and methyl and $R^1$ is a member of the group consisting of alkyl, aryl and acyl radicals,
 (2)

in which $R^2$ is a member of the group consisting of hydrogen and alkyl radicals and
 (3)

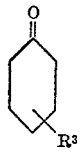

in which $R^3$ is a member of the group consisting of hydrogen and alkyl radicals; and
(IV) a malonic acid derivative selected from the group consisting of dialkyl malonates, diaryl malonates and anilino malonates.

2. The process of claim 1 wherein the compound is decachlorooctahydro - 1,3,4-metheno-2H-cyclobuta (cd) pentalen-2-one.

3. The process of claim 1 wherein the compound is the alcohol obtained by reduction of decachlorooctahydro-1,3,4-metheno-2H-cyclobuta (cd) pentalen-2-one.

4. The process of claim 1 wherein the compound is an adduct of decachlorooctahydro-1,3,4-metheno-2H-cyclobuta (cd) pentalen-2-one and an aliphatic, cycloaliphatic, or aromatic primary or secondary monohydric alcohol.

5. The process of claim 4 wherein the compound is an adduct of decachlorooctahydro-1,3,4-metheno-2H-cyclobuta (cd) pentalen-2-one and a primary amyl alcohol.

6. The process of claim 1 wherein the compound is an adduct of decachlorooctahydro-1,3,4-metheno-2H-cyclobuta (cd) pentalen-2-one and an aliphatic, cycloaliphatic or aromatic primary or secondary monoamine.

7. The process of claim 6 wherein the compound is an adduct of decachlorooctahydro-1,3,4-metheno-2H-cyclobuta (cd) pentalen-2-one and a tertiary alkyl primary monoamine containing from 18 to 22 carbon atoms.

8. The process of claim 1 wherein the compound is an adduct of decachlorooctahydro-1,3,4-metheno-2H-cyclobuta (cd) pentalen-2-one and a ketone having a formula selected from the group consisting of:
 (1) $RCH_2COR^1$ in which R is a member of the group consisting of hydrogen and methyl and $R^1$ is a member of the group consisting of alkyl, aryl and acyl radicals,
 (2)

in which $R^2$ is a member of the group consisting of hydrogen and alkyl and radicals and
 (3)

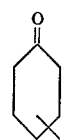

in which $R^3$ is a member of the group consisting of hydrogen and alkyl radicals.

9. The process of claim 8 wherein the compound is an adduct of decachlorooctahydro-1,3,4-metheno-2H-cyclobuta (cd) pentalen-2-one and methyl ethyl ketone.

10. The process of claim 8 wherein the compound is an adduct of decachlorooctahydro-1,3,4-metheno-2H-cyclobuta (cd) pentalen-2-one and 2-pentanone.

11. The process of claim 8 wherein the compound is an adduct of decachlorooctahydro-1,3,4-metheno-2H-cyclobuta (cd) pentalen-2-one and monochloroacetone.

12. The process of claim 1 wherein the compound is an adduct of decachlorooctahydro-1,3,4-metheno-2H-cyclobuta (cd) pentalen-2-one and a malonic acid derivative selected from the group consisting of dialkyl malonates, diaryl malonates and anilino malonates.

13. The process of claim 1 wherein the microorganisms are gram-positive bacteria in the presence of dermatophytic fungi.

References Cited

UNITED STATES PATENTS

| | | | |
|---|---|---|---|
| 2,702,305 | 2/1955 | Gilbert | 260—648 |
| Re 24,435 | 2/1958 | Gilbert et al. | 260—586 |
| 3,055,948 | 9/1962 | Hoch et al. | 260—611 |
| 3,096,239 | 7/1963 | Hoch et al. | 71—67 |
| 3,259,543 | 7/1966 | Gilbert et al. | 424—325 |
| 3,278,579 | 10/1966 | Gilbert et al. | 260—468 |
| 3,341,406 | 9/1967 | Gilbert et al. | 424—313 |
| 3,361,623 | 1/1968 | Gilbert et al. | 424—343 |
| 3,369,965 | 2/1968 | Gilbert | 424—331 |
| 3,393,223 | 7/1968 | Lombardo | 260—468 |

LEWIS GOTTS, *Primary Examiner.*

S. K. ROSE, *Assistant Examiner.*

U.S. Cl. X.R.

424—250, 267, 285, 309, 324, 325, 330, 331, 343, 352